United States Patent
Belton, Jr. et al.

(10) Patent No.: US 11,522,898 B1
(45) Date of Patent: Dec. 6, 2022

(54) AUTONOMOUS CONFIGURATION MODELING AND MANAGEMENT

(71) Applicant: Wells Fargo Bank, N.A., San Francisco, CA (US)

(72) Inventors: Lawrence T. Belton, Jr., Charlotte, NC (US); Jon M. Welborn, Winston Salem, NC (US); Gary Simms, Sr., Manassas, VA (US); Peter Anatole Makohon, Huntersville, NC (US); Jacob Lee, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 38 days.

(21) Appl. No.: 16/222,105

(22) Filed: Dec. 17, 2018

(51) Int. Cl.
*H04L 29/06* (2006.01)
*H04L 9/40* (2022.01)
(Continued)

(52) U.S. Cl.
CPC ........ *H04L 63/1433* (2013.01); *G06K 9/6256* (2013.01); *G06N 5/02* (2013.01);
(Continued)

(58) Field of Classification Search
CPC . H04L 63/1433; H04L 63/1425; H04L 63/20; G06K 9/6256; G06N 20/00; G06N 5/02
See application file for complete search history.

(56) References Cited

U.S. PATENT DOCUMENTS

| | | |
|---|---|---|
| 6,711,615 B2 | 3/2004 | Porras et al. |
| 8,285,704 B2 | 10/2012 | Waters et al. |

(Continued)

FOREIGN PATENT DOCUMENTS

| | | | | |
|---|---|---|---|---|
| CN | 108188622 | * | 6/2018 | .......... G06F 21/577 |
| EP | 1473872 A2 | | 11/2004 | |
| WO | 1997020419 A2 | | 6/1997 | |

OTHER PUBLICATIONS

Stephenson, C., "Using machine learning to classify devices on your network," GAB41; Located Via:DowJones Factiva: Technical Literature Search; Download URL:https://gab41.lab41.org/using-machine-learning-to-classify-devices-on-your-network-538264c8b820, Apr. 24, 2018; retrieved on Jun. 30, 2021.

*Primary Examiner* — Taghi T Arani
*Assistant Examiner* — Lin Chang
(74) *Attorney, Agent, or Firm* — Kilpatrick Townsend & Stockton LLP

(57) ABSTRACT

The innovation disclosed and claimed herein, in one aspect thereof, comprises systems and methods of autonomous asset configuration modeling and management. The innovation includes probing elements of a networked architecture to compile information about elements in the networked architecture. The innovation learns a configuration for the at least one element in the environment based on the probing and determines vulnerabilities in the learned configuration. The innovation develops a threat model based on the learned configuration. The innovation applies the threat model to the elements of the networked architecture and deploys a configuration that resolves the vulnerabilities based on the threat model to the elements in the networked architecture. The threat model can be developed over time using machine learning concepts and deep learning of data sources associated with the elements and vulnerabilities.

12 Claims, 6 Drawing Sheets

(51) Int. Cl.
  *G06N 20/00* (2019.01)
  *G06K 9/62* (2022.01)
  *G06N 5/02* (2006.01)
(52) U.S. Cl.
  CPC ......... *G06N 20/00* (2019.01); *H04L 63/1425* (2013.01); *H04L 63/20* (2013.01)

(56) References Cited

U.S. PATENT DOCUMENTS

| | | | |
|---|---|---|---|
| 8,438,273 B2 | 5/2013 | Motoyama | |
| 8,560,684 B2 | 10/2013 | Ernst | |
| 8,977,584 B2 | 3/2015 | Nelson | |
| 9,135,293 B1 | 9/2015 | Kienzle et al. | |
| 9,313,639 B2 | 4/2016 | Salkini et al. | |
| 9,319,419 B2 | 4/2016 | Sprague et al. | |
| 9,443,002 B1 * | 9/2016 | Freese | G06F 16/285 |
| 9,576,262 B2 | 2/2017 | Ganguly et al. | |
| 9,690,933 B1 * | 6/2017 | Singh | G06N 5/025 |
| 9,691,030 B2 | 6/2017 | Micali et al. | |
| 9,749,353 B1 * | 8/2017 | Benskin | G06N 5/04 |
| 2011/0165891 A1 * | 7/2011 | Niemenmaa | H04W 60/04 455/456.1 |
| 2012/0066217 A1 * | 3/2012 | Eder | G06F 16/951 707/723 |
| 2012/0137367 A1 * | 5/2012 | Dupont | G06F 21/00 726/25 |
| 2014/0321470 A1 * | 10/2014 | Ookawa | H04L 49/3009 370/395.53 |
| 2015/0373043 A1 * | 12/2015 | Wang | G06F 21/6254 706/12 |
| 2018/0137288 A1 * | 5/2018 | Polyakov | G06F 21/552 |
| 2018/0183684 A1 * | 6/2018 | Jacobson | H04L 47/805 |
| 2019/0102155 A1 * | 4/2019 | Garvey | G06F 16/906 |
| 2020/0043569 A1 * | 2/2020 | Gross | C12Q 1/6869 |
| 2020/0067983 A1 * | 2/2020 | Soryal | G06F 9/45558 |
| 2020/0068031 A1 * | 2/2020 | Kursun | H04W 24/02 |

* cited by examiner

AUTONOMOUS CONFIGURATION MODELING AND MANAGEMENT

BACKGROUND

Networks are often becoming more complex and more distributed. Especially for large corporations or financial institutions. The networks continuously are adding network elements to the network that have different configurations, security policies, access policies, and/or the like. It is becoming increasingly difficult to manage each element or type of element on a growing network. Especially difficult is managing and learning the changing threat levels and ensuring a centralized implementation model evolved with the changes.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods of intelligent learning and management of networked architecture. The method includes probing at least one element of a networked architecture, the networked architecture having a set of elements comprising software elements and hardware elements interconnected in a common environment, and wherein the probing compiles information about the at least one element of the set of elements. The method includes learning a configuration for the at least one element in the environment based on the probing. The method includes developing a threat model based on the learned configuration.

A system of the innovation can include a probe component that probes at least one element of a networked architecture. The networked architecture has a set of elements comprising software elements and hardware elements interconnected in a common environment, where the probing compiles information about the at least one element of the set of elements. A diagnosis component learns a configuration for the at least one element in the environment based on the probing. A modeling component develops a threat model based on the learned configuration.

A computer readable medium having instructions to control one or more processors. The instructions can include probing at least one element of a networked architecture. The networked architecture has a set of elements comprising software elements and hardware elements interconnected in a common environment. The probing compiles information about the at least one element of the set of elements. The instructions include learning a configuration for the at least one element in the environment based on the probing and determining at least one vulnerability in the learned configuration. The instructions include developing a threat model based on the learned configuration. The instructions include applying the threat model to the networked architecture; and deploying a configuration that resolves the at least one vulnerability based on the threat model to the set of elements in the networked architecture.

In aspects, the subject innovation provides substantial benefits in terms of learning an environment and a networked architecture. One advantage resides in a centralized configuration model for elements in a networked architecture. Another advantage resides in developing the model over time using machine learning techniques.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
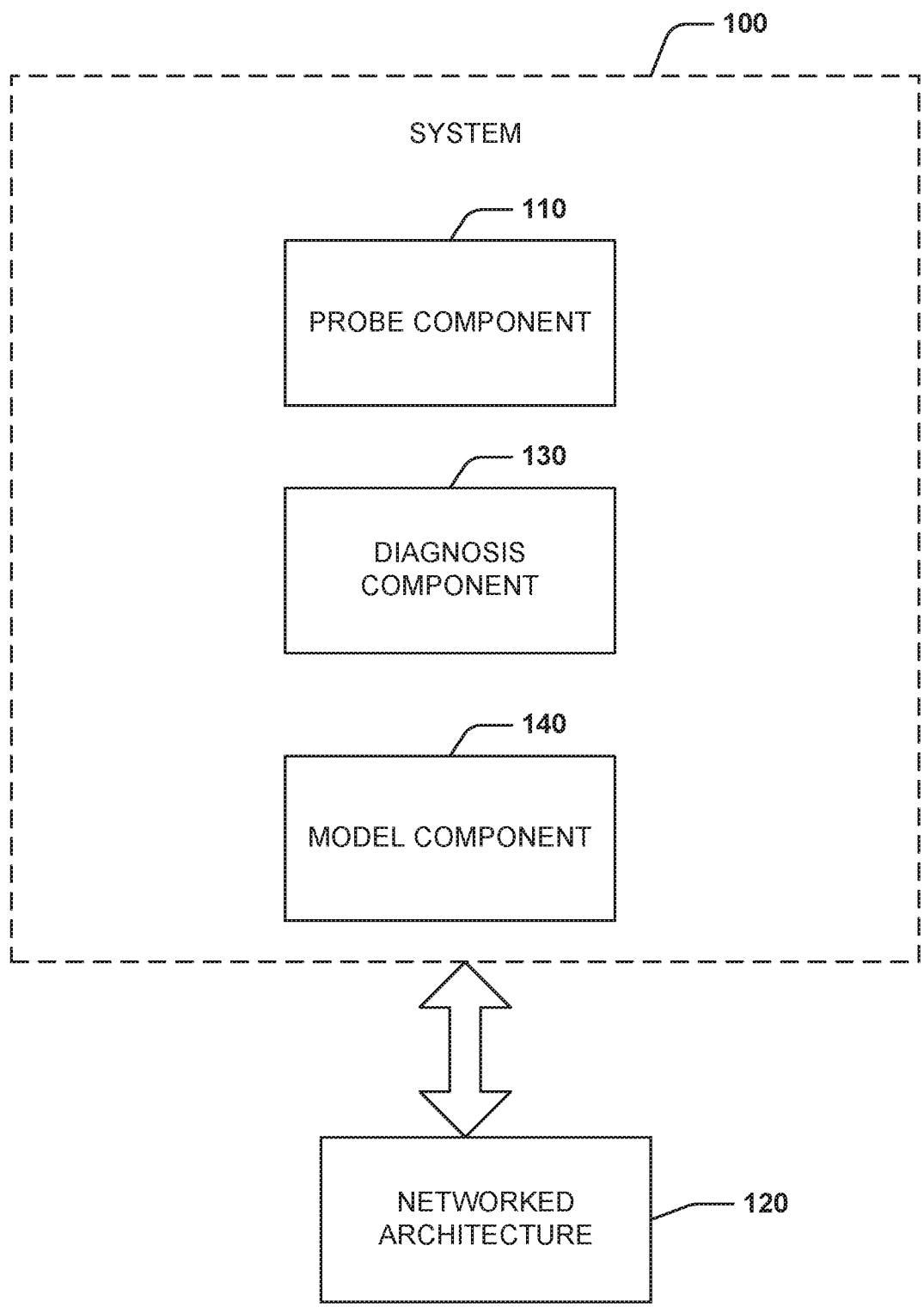
FIG. 1 illustrates an example component diagram of a system of the present innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 1 illustrates a system 100 for autonomous asset configuration modeling and management. The system 100 includes a probe component 110. The probe component 110 intelligently probes elements of a networked architecture 120. In some embodiments, the networked architecture 120 includes elements interconnected in a common environment. The elements can include software elements, hardware elements, and/or the like. The environment can be a distributed system, open network, closed network, local area network, and/or the like through which data and/or network traffic traverses to connect the elements.

The probe component 110 intelligently probes a set of elements using interconnections in the networked architecture 120. The probe component 110 probes the set of elements to compile data about the set of elements. The probe component 110 can determine data from which a configuration of an element in the networked architecture 120 can be derived. In some embodiments, the data can make vulnerabilities apparent through the probing.

The system 100 includes a diagnosis component 130. The diagnosis component 130 determines a configuration for at least one element in the environment based on the probing. In some embodiments, the diagnosis component 130 determines a configuration for the entire networked architecture 120. The diagnosis component 130 utilizes the compiled data from the probe component 110 to determine a configuration.

In some embodiments, the diagnosis component 130 determines a known configuration of at least one element in the set of elements from the probed data from the probe component 110. In other embodiments, the diagnosis component 130 determines one or more sub-configurations for different elements in the environment. The diagnosis component 130 compiles the sub-configurations into a batched configuration for the set of elements.

The diagnosis component 130 learns the configuration of the set of elements of the networked architecture 120. In some embodiments, the configuration of each element of the set of elements includes a unique identifier and/or a type identifier to distinguish elements on the networked architecture 120. For example, a software element may be unique to a specific device but also have server copies of the same software elements on multiple devices in the environment. The unique identifier can indicate the element on the specific device and the type identifier can indicate all copies installed of the same software element. In some embodiments, a unique identifier is a serial number, MAC address, IP address, network name, and/or the like. In some embodiments, the type identifier is product name, brand name, model number, workgroup, and/or the like.

In some embodiments, the diagnosis component 130 analyzes the configuration to determine vulnerabilities of an element or set of elements on the networked architecture 120. The diagnosis component 130 can determine vulnerabilities from a list of known vulnerabilities, learned vulnerabilities over time, performance anomalies that arose from the probing, and/or the like.

The system 100 includes a model component 140. The model component 140 generates a threat model based on the vulnerabilities determined by the diagnosis component 130. The model can simulate, generate, and deploy configurations that resolve the vulnerabilities determined by the diagnosis component 130. The model component 140 can develop the threat model based on learned behavior of the vulnerabilities, learned information about the vulnerabilities, best practices, other data sources, and/or the like. In some embodiments, the model can be developed and/or refined over time.

In some embodiments, the model component 140 determines a threat score of the element(s) and/or vulnerabilities determined by the diagnosis component 130. The model component 140 can determine the threat score by accessing data sources associated with the vulnerability and/or the set of elements. In some embodiments, the model component 140 determines data sources associated with the set of elements using the identifiers from the diagnosis component 130.

In other embodiments, the data sources can be system behaviors, human behaviors, internet databases, intranet databases, and/or the like. System behaviors can be how the system is performing (e.g. underperforming, faults, blind spots, performance metrics, and/or the like). Human behaviors can include instances when the system 100 has failed to determine a configuration for the environment and therefore needed human intervention to determine a best configuration. In some embodiments, human behaviors can be recorded interactions with the elements that indicate inefficiencies to remedy through a new configuration to fix the vulnerability.

Internet databases can be found using the unique identifier and/or type identifier to direct the model component 140 to websites, online manuals, product information databases, and/or the like. The internet databases can have information such as version logs, change logs, patches, updates, support information, end-of-life tracking, and/or the like. In some embodiments, the internet database can indicate alternative elements to the elements currently being employed by the networked architecture 120. Intranet databases can include information managed by a system administrator and/or the like to include best practices for a company, internal rules, preferred vendors, client preferences, security requirements, government requirements, and/or the like.

In some embodiments, the threat score can be indicative of lack of knowledge or data about an element or vulnerability in the networked architecture 120. The model component 140 can use the threat score direct deep learning techniques and/or further learning of particular elements in the networked architecture 120.

The model component 140 compiles data associated with the set of elements from the determined data sources. The model component 140 analyzes information from the compiled data to facilitate determining a threat model. For example, the model component 140 can analyze the compiled data to determine a threat level and/or develop the threat model. The threat model can be an implementation model for configurations deployed to the networked architecture 120 and/or the set of elements. In some embodiments, the threat model can be developed over time by learning from the analyzed information for future configuration decisions using machine learning techniques, artificial intelligence, deep learning intelligence, and/or the like.

The model component 140 can generate a configuration for a specific element and/or a set of elements using the threat model and threat score. The model component 140 can deploy or implement the configuration to the networked architecture 120 such that the configuration is in accordance to the threat model. In some embodiments, the model component 140 can prioritize deployment of configurations based on a threat score of an element and/or vulnerability. For example, a high threat score of a vulnerability can prioritize deployment to resolve the vulnerability before lower scored vulnerabilities or elements.

Figure 2:
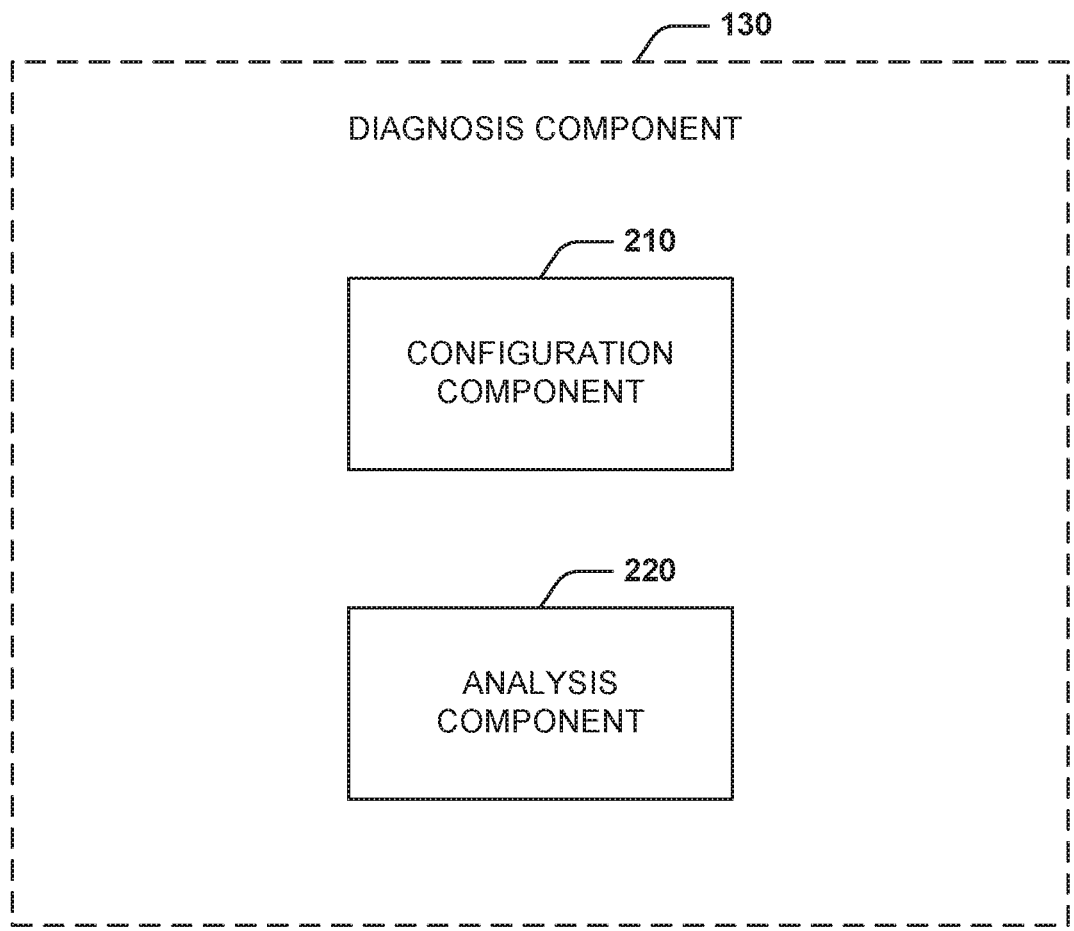
FIG. 2 illustrates an example component diagram of a diagnosis component.

FIG. 2 illustrates a detailed component diagram of a diagnosis component 130. The diagnosis component 130 includes a configuration component 210. The configuration component 210 determines a configuration for at least one element in the environment based on the probing. In some embodiments, the configuration component 210 determines a configuration for the entire networked architecture 120. The configuration component 210 utilizes the compiled data from the probe component 110 to determine a configuration.

In some embodiments, the configuration component 210 determines a known configuration of at least one element in the set of elements from the probed data from the probe component 110. In other embodiments, the configuration component 210 determines one or more sub-configurations for different elements in the environment. The configuration component 210 compiles the sub-configurations into a batched configuration for the set of elements.

The configuration component 210 learns the configuration of the set of elements of the networked architecture 120. In some embodiments, the configuration of each element of the set of elements includes a unique identifier and/or a type identifier to distinguish elements on the networked architecture 120. For example, a software element may be unique to a specific device but also have server copies of the same software elements on multiple devices in the environment. The unique identifier can indicate the element on the specific device and the type identifier can indicate all copies installed of the same software element. In some embodiments, a unique identifier is a serial number, MAC address, IP address, network name, and/or the like. In some embodiments, the type identifier is product name, brand name, model number, workgroup, and/or the like.

The diagnosis component 120 includes an analysis component 220. The analysis component 220 analyzes the configuration to determine vulnerabilities of an element or set of elements on the networked architecture 120. The analysis component 220 can determine vulnerabilities from a list of known vulnerabilities, learned vulnerabilities over time, performance anomalies that arose from the probing, and/or the like.

Figure 3:
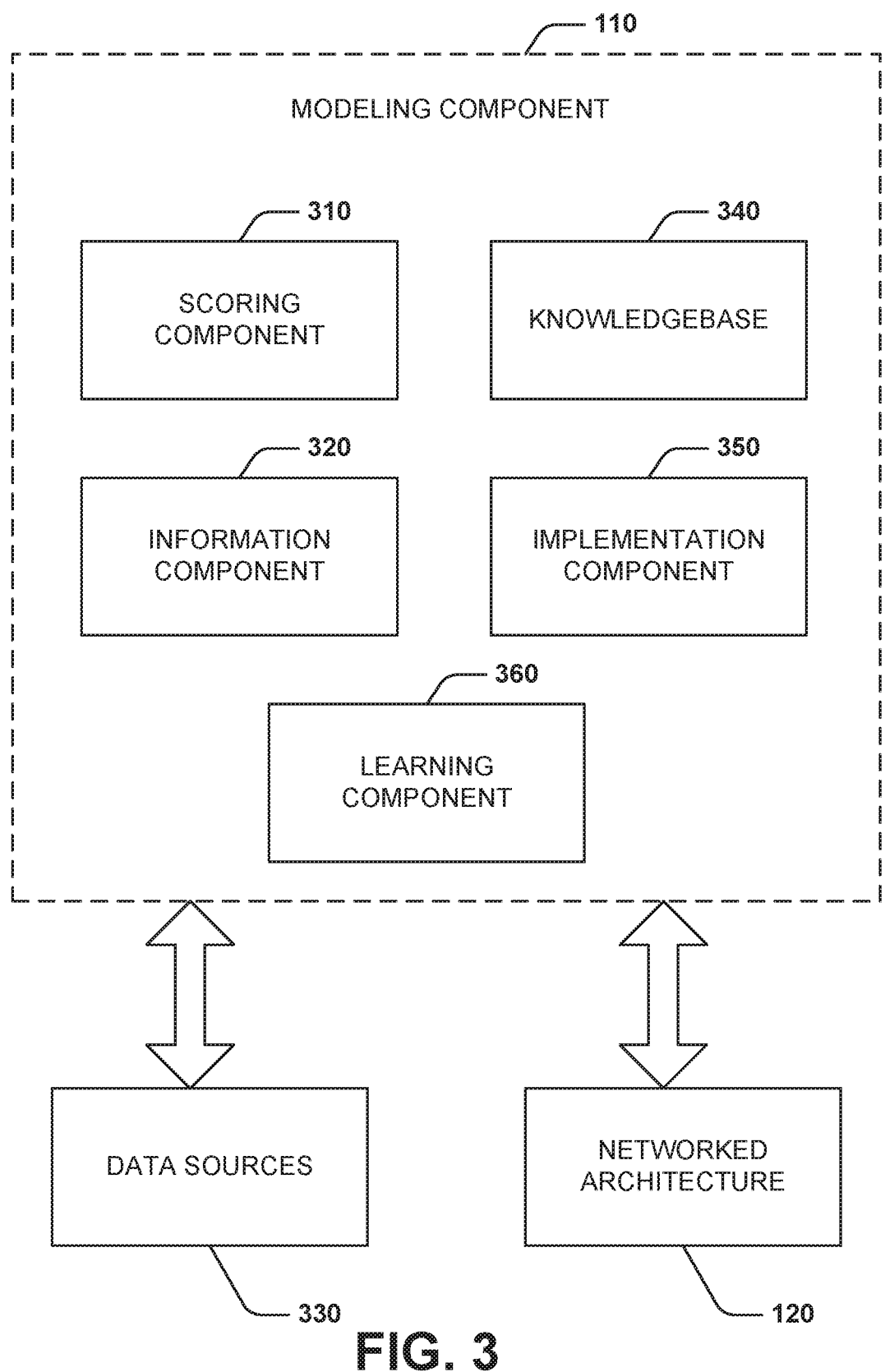
FIG. 3 illustrates an example component diagram of a model component.

FIG. 3 illustrates a detailed component diagram of the model component 140. The model component 140 includes a scoring component 310. The scoring component 310 determines a threat score of the vulnerability determined by the diagnosis component 130. The scoring component 310 can determine the threat score by receiving data from data sources associated with the vulnerability and/or the set of elements. The scoring component 310 can apply weights to different data sources.

The model component 140 includes an information component 320. The information component 320 determines data sources 330 associated with the set of elements using the identifiers. In some embodiments, the data sources 330 can be system behaviors, human behaviors, internet databases, and/or intranet databases. System behaviors can be how the system is performing (e.g. underperforming, faults, blind spots, performance metrics, and/or the like). Human behaviors can include instances when the system 100 has failed to determine a configuration for the environment and therefore needed human intervention to determine a best configuration.

Internet databases can be found using the unique identifier and/or type identifier to direct the information component 320 to websites, online manuals, product information databases, and/or the like. The internet databases can have information such as version logs, change logs, patches, updates, support information, end-of-life tracking, and/or the like. Intranet databases can include information managed by a system administrator and/or the like to include best practices for a company, internal rules, preferred vendors, client preferences, security requirements, government requirements, and/or the like.

The model component 140 includes a knowledgebase 340. The knowledgebase 340 compiles data from the determined data sources 330 associated with the set of elements. The knowledgebase 340 can prioritize compiling data from data sources most relevant to the set of elements according to a predetermined prioritization or a learned prioritization.

In some embodiments, the scoring component 210 can determine a lack of knowledge or data about an element or vulnerability in the networked architecture 120 due to the threat score. The scoring component 210 can use the threat score to direct deep learning techniques and/or further learning of particular elements in the networked architecture 120.

The model component 140 includes an implementation component 350. The implementation component 350 analyzes information from the compiled data to facilitate determining a threat model. In some embodiments, the implementation component 350 utilizes deep learning, machine learning, and/or the like on the data compiled by the knowledgebase 340. For example, the implementation component 350 can analyze the compiled data to determine a threat level and/or develop the threat model. The threat model can be an implementation model or centralized model for configurations deployed to the networked architecture 120 and/or the set of elements.

The implementation component 350 can generate a configuration for a specific element and/or a set of elements using the threat model and threat score. The implementation component 350 can deploy or implement the configuration to the networked architecture 120 such that the configuration is in accordance to the threat model.

The model component 140 can include a learning component 360. The learning component 360 can develop and update the threat model over time by learning from the analyzed information for future configuration decisions using machine learning techniques, artificial intelligence, deep learning intelligence, and/or the like. In some embodiments, the implementation component 210 can prioritize deployment of configurations based on a threat score of an element and/or vulnerability. For example, a high threat score of an element can prioritize deployment of a configuration to resolve a vulnerability in the element before lower scored vulnerabilities or elements.

Figure 4:
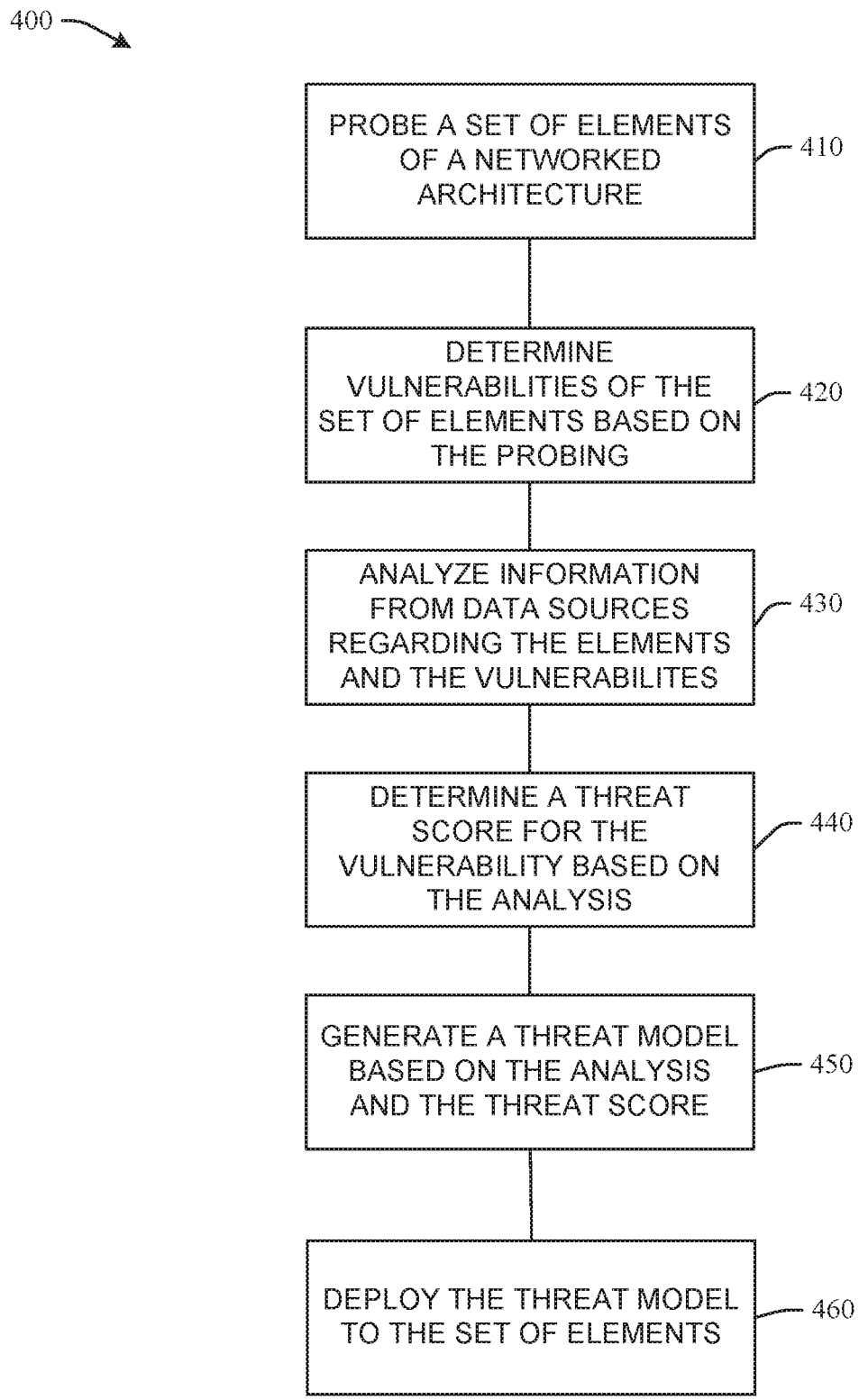
FIG. 4 illustrates a method for autonomous asset configuration modeling.

With reference to FIG. 4, example method 400 is depicted for authenticating a user to verify identity. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

FIG. 4 illustrates a method 400 for autonomous asset configuration modeling and management. At 410, a set of elements of a networked architecture are probed. The probing can collect data about each element in the set of elements. At 420, vulnerabilities for the set of elements are determined. At 430, information about the vulnerabilities and the set of elements from determined data sources are analyzed using deep learning techniques and/or the like. At 440, a threat score is determined for the vulnerabilities and/or the set of elements based on the analysis. At 450, a threat model is generated based on the threat score and the vulnerability analysis. At 460, the threat model is deployed to the set of elements to cure the vulnerabilities in the set of elements.

Figure 5:
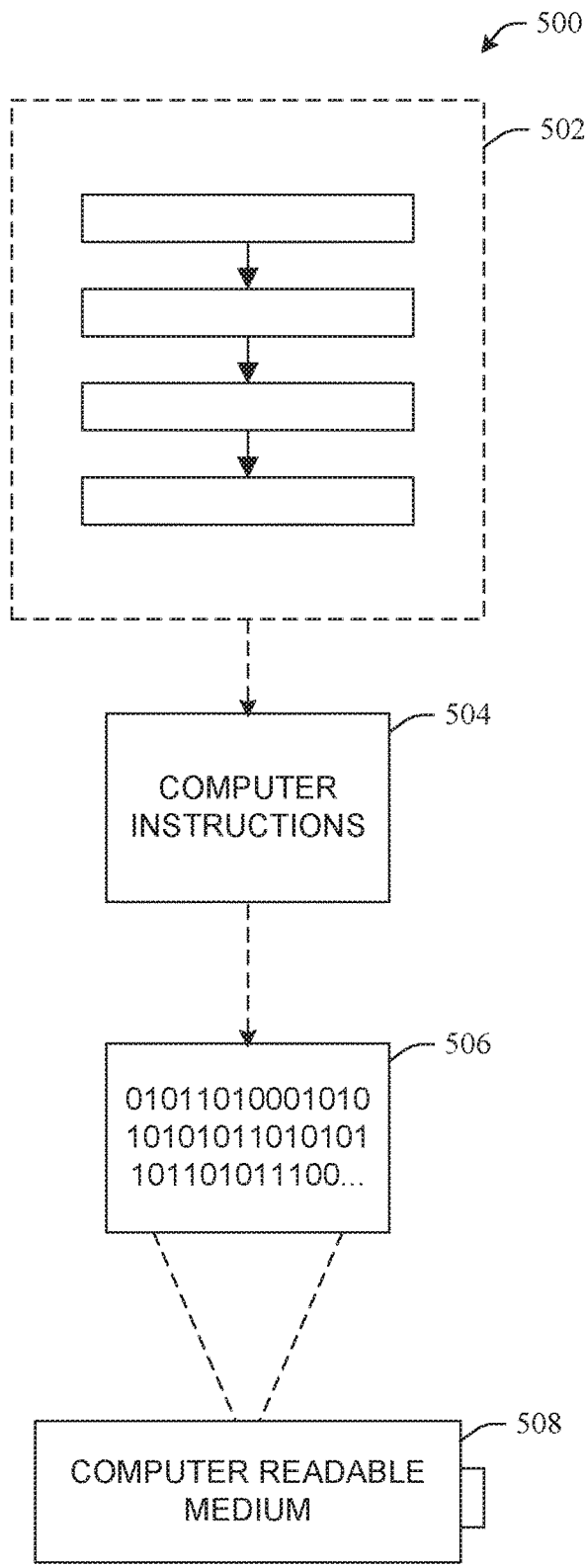
FIG. 5 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 5, wherein an implementation 500 comprises a computer-readable medium 508, such as a CD-R, DVD-R, flash drive, a platter of a hard disk drive, etc., on which is encoded computer-readable data 506. This computer-readable data 506, such as binary data comprising a plurality of zero's and one's as shown in 506, in turn comprises a set of computer instructions 504 configured to operate according to one or more of the principles set forth herein. In one such embodiment 500, the processor-executable computer instructions 504 is configured to perform a method 502, such as at least a portion of one or more of the methods described in connection with embodiments disclosed herein. In another embodiment, the processor-executable instructions 504 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 6:
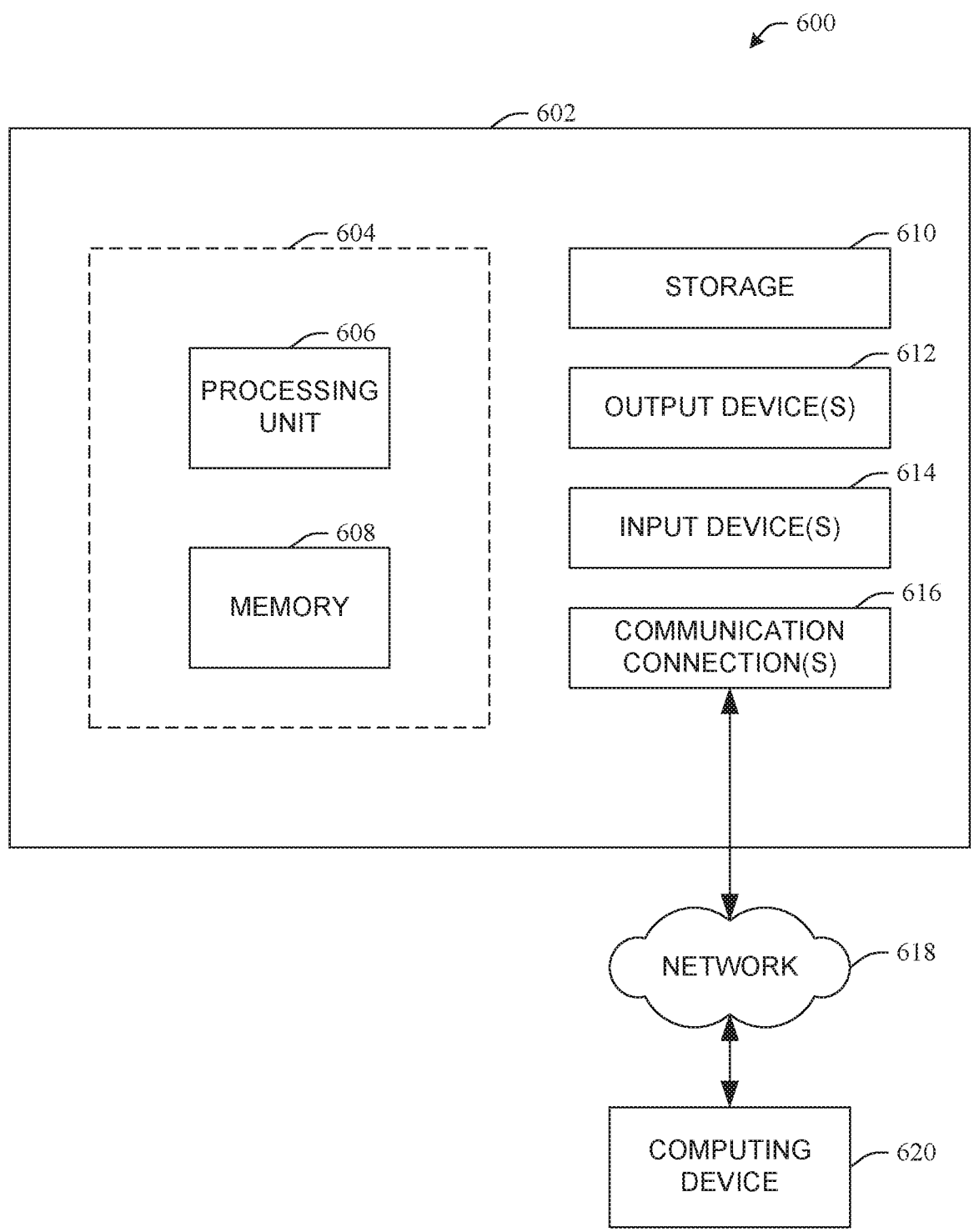
FIG. 6 illustrates a computing environment where one or more of the provisions set forth herein can be implemented, according to some embodiments.

With reference to FIG. 6 and the following discussion provide a description of a suitable computing environment in which embodiments of one or more of the provisions set forth herein can be implemented. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 6 illustrates a system 600 comprising a computing device 602 configured to implement one or more embodiments provided herein. In one configuration, computing device 602 can include at least one processing unit 606 and memory 608. Depending on the exact configuration and type of computing device, memory 608 may be volatile, such as RAM, non-volatile, such as ROM, flash memory, etc., or some combination of the two. This configuration is illustrated in FIG. 6 by dashed line 604.

In these or other embodiments, device 602 can include additional features or functionality. For example, device 602 can also include additional storage such as removable storage or non-removable storage, including, but not limited to, magnetic storage, optical storage, and the like. Such additional storage is illustrated in FIG. 6 by storage 610. In some embodiments, computer readable instructions to implement one or more embodiments provided herein are in storage 610. Storage 610 can also store other computer readable instructions to implement an operating system, an application program, and the like. Computer readable instructions can be accessed in memory 608 for execution by processing unit 606, for example.

The term "computer readable media" as used herein includes computer storage media. Computer storage media includes volatile and nonvolatile, non-transitory, removable and non-removable media implemented in any method or technology for storage of information such as computer readable instructions or other data. Memory 608 and storage 610 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 602. Any such computer storage media can be part of device 602.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 602 can include one or more input devices 614 such as keyboard, mouse, pen, voice input device, touch input device, infrared cameras, video input devices, or any other input device. One or more output devices 612 such as one or more displays, speakers, printers, or any other output device can also be included in device 602. The one or more input devices 614 and/or one or more output devices 612 can be connected to device 602 via a wired connection, wireless connection, or any combination thereof. In some embodiments, one or more input devices or output devices from another computing device can be used as input device(s) 614 or output device(s) 612 for computing device 602. Device 602 can also include one or more communication connections 616 that can facilitate communications with one or more other devices 620 by means of a communications network 618, which can be wired, wireless, or any combination thereof, and can include ad hoc networks, intranets, the Internet, or substantially any other communications network that can allow device 602 to communicate with at least one other computing device 620.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    probing at least one element of a set of elements of a networked architecture, the networked architecture comprising software elements and hardware elements interconnected in a common environment, and wherein the probing compiles information about the at least one element of the set of elements;
    learning a first configuration for the at least one element in the common environment based on the probing, wherein the learning comprises:
        determining the set of elements of the networked architecture, the set of elements having identifiers;
        determining a plurality of types of data sources associated with the set of elements using the identifiers, wherein the plurality of types of data sources comprise external data sources having information about the set of elements, the plurality of types of data sources comprising behavior data describing performance of the set of elements or interactions with the set of elements; and
        compiling data from the plurality of types of data sources according to a learned priority of the plurality of types of data sources, the learned priority indicating the most relevant data sources to the set of elements learned over time;
    determining at least one vulnerability in the learned first configuration;
    analyzing the at least one vulnerability;
    determining a threat score for the at least one vulnerability based on the analysis;
    developing a threat model based on the learned first configuration and the threat score for the at least one vulnerability;
    applying the threat model to the networked architecture to determine a second configuration that resolves the at least one vulnerability; and
    deploying the second configuration wherein the deployment of the second configuration is prioritized based on the threat score.

2. The method of claim 1, wherein the second configuration includes at least one of an installation, an upgrade, a patch, or an uninstallation.

3. The method of claim 1, wherein analyzing the vulnerability comprises: applying deep learning to the vulnerability using at least one learned data source; and compiling the threat score based on the deep learning of the vulnerability.

4. The method of claim 1, wherein the plurality of types of data sources comprise at least one of system behavior, human behavior, previous configurations, exploitation signatures, failed configurations, internet database, or intranet database.

5. The method of claim 1, comprising:
    compiling the data associated with the set of elements into a knowledgebase; and
    determining via machine learning the data of the knowledgebase; and
    continuously updating the threat model according to the machine learning of the information.

6. A system, comprising:
    one or more processors;
    a non-transitory computer-readable storage medium having program code that is executable by the one or more processors to cause the one or more processors to perform operations comprising:
    probing at least one element of a set of elements of a networked architecture, the networked architecture comprising software elements and hardware elements interconnected in a common environment, and wherein the probing compiles information about the at least one element of the set of elements; learning a first configuration for the at least one element in the common environment based on the probing, wherein the learning comprises: determining the set of elements of the networked architecture, the set of elements having identifiers; determining a plurality of types of data sources associated with the set of elements using the identifiers, wherein the plurality of types of data sources comprise external data sources having information about the set of elements, the plurality of types of data sources comprising behavior data describing performance of the set of elements or interactions with the set of elements; and compiling data from the plurality of types of data sources according to a learned priority of the plurality of types of data sources, the learned priority indicating the most relevant data sources to the set of elements learned over time; determining at least one vulnerability in the learned first configuration; analyzing the at least one vulnerability; determining a threat score for the determined vulnerability and the at least one element developing a threat model based on the learned first configuration and the threat score for the at least one vulnerability; and applying the threat model to the networked architecture to determine a second configuration that resolves the at least one vulnerability; and deploying the second configuration wherein the deployment of the second configuration is prioritized based on the threat score.

7. The system of claim 6, wherein the second configuration includes at least one of an installation, an upgrade, a patch, or uninstallation.

8. The system of claim 6, wherein the operations further comprise:
    applying deep learning to the vulnerability using at least one learned data source; and
    compiling the threat score based on the deep learning of the vulnerability.

9. The system of claim 6, wherein the plurality of types of data sources comprise at least one of system behavior, human behavior, previous configurations, exploitation signatures, failed configurations, internet database, or intranet database.

10. The system of claim 6, wherein the operations further comprise:
- compiling data associated with the set of elements into a knowledgebase; and
- learning the data of the knowledgebase using machine learning; and
- continuously updating the threat model according to the machine learning of the data.

11. A non-transitory computer readable medium having instructions executable by one or more processors to cause the one or more processor to:
- probe at least one element of a set of elements of a networked architecture, the networked architecture comprising software elements and hardware elements interconnected in a common environment, and wherein the probing compiles information about the at least one element of the set of elements;
- learn a first configuration for the at least one element in the common environment based on the probing, wherein the learning comprises:
  - determining the set of elements of the networked architecture, the set of elements having identifiers;
  - determining a plurality of types of data sources associated with the set of elements using the identifiers, wherein the plurality of types of data sources comprise external data sources having information about the set of elements, the plurality of types of data sources comprising behavior data describing performance of the set of elements or interactions with the set of elements; and
  - compiling data from the plurality of types of data sources according to a learned priority of the plurality of types of data sources, the learned priority indicating the most relevant data sources to the set of elements learned over time;
- determine at least one vulnerability in the learned first configuration;
- analyze the at least one vulnerability;
- determine a threat score for the determined vulnerability and the at least one element;
- develop a threat model based on the learned first configuration and the threat score for the at least one vulnerability;
- apply the threat model to the networked architecture to determine a second configuration that resolves the at least one vulnerability; and
- deploy the second configuration based on the threat model to the set of elements in the networked architecture, wherein the deployment of the second configuration is prioritized based on the threat score.

12. The non-transitory computer readable medium of claim 11, wherein the instructions further cause the one or more processors to:
- learn data of the set of elements and vulnerability using deep learning; and
- continuously update the threat model according to the learning of the data.

\* \* \* \* \*